(12) United States Patent
Choi et al.

(10) Patent No.: US 9,564,265 B2
(45) Date of Patent: Feb. 7, 2017

(54) COIL ASSEMBLY FOR A CONTROL ROD DRIVER HAVING IMPROVED THERMAL RESISTANCE, AND METHOD FOR MANUFACTURING THE SAME

(71) Applicant: Korea Hydro & Nuclear Power Co., Ltd., Gyeongju-Si, Gyeongsangbuk-Do (KR)

(72) Inventors: Yang Jo Choi, Daejeon (KR); Young Ho Jang, Busan (KR); Jae Gon Lee, Daejeon (KR)

(73) Assignee: Korea Hydro & Nuclear Power Co., Ltd., Gyeongju, Gyeongsanbuk-do (KR)

( * ) Notice: Subject to any disclaimer, the term of this patent is extended or adjusted under 35 U.S.C. 154(b) by 9 days.

(21) Appl. No.: 13/950,943

(22) Filed: Jul. 25, 2013

(65) Prior Publication Data

US 2013/0335181 A1    Dec. 19, 2013

Related U.S. Application Data

(63) Continuation of application No. PCT/KR2011/000690, filed on Feb. 1, 2011.

(30) Foreign Application Priority Data

Jan. 27, 2011    (KR) .......................... 10-2011-0008242

(51) Int. Cl.
*H01F 27/02*    (2006.01)
*G21C 7/10*    (2006.01)
(Continued)

(52) U.S. Cl.
CPC .............. *H01F 27/022* (2013.01); *G21C 7/10* (2013.01); *G21C 7/12* (2013.01); *G21C 21/18* (2013.01);
(Continued)

(58) Field of Classification Search
USPC ........................................................... 336/96
See application file for complete search history.

(56) References Cited

U.S. PATENT DOCUMENTS 4,992,684 A * 2/1991 Matsui ........................ 310/12.08
5,358,786 A * 10/1994 Ishikawa et al. ............. 428/380
(Continued)

FOREIGN PATENT DOCUMENTS

EP            2239828 A2 * 10/2010
JP          02270210 A  * 11/1990
(Continued)

*Primary Examiner* — Tsz Chan
(74) *Attorney, Agent, or Firm* — Mintz Levin Cohn Ferris Glovsky and Popeo, P.C.; Kongsik Kim; Caroline Säve

(57) ABSTRACT

Provided is a coil assembly having improved heat resistance for use in a control rod driver, in which the heat resistance of coils is improved to increase the lifespan thereof and the deterioration of the coils and the fall of a control rod are thus securely prevented from occurring due to continuous operations of the control rod driver during an automatic load follow operation, thereby improving the safety and economic feasibility of a nuclear power plant, and a method for manufacturing the same. The coil assembly includes a covered wire (110) which includes a coil wire (111) and a polyether ether ketone (PEEK) coating layer (112) covering an outer circumferential surface of the coil wire (111) and is wound in multiple layers; a coil coating layer (130) formed by filling gaps in the covered wire (110) with varnish; an insulating tape layer (120) covering external sides of a wound layer of the covered wire (110) insulated by the coil coating layer (130); and silicon molding (140) covering external sides of the insulating tape layer (120).

2 Claims, 5 Drawing Sheets

(51) Int. Cl.
*G21C 7/12* (2006.01)
*H01F 5/06* (2006.01)
*G21C 21/18* (2006.01)
*H01F 41/12* (2006.01)
*H01F 27/32* (2006.01)

(52) U.S. Cl.
CPC .............. *H01F 5/06* (2013.01); *H01F 41/127* (2013.01); *H01F 27/327* (2013.01); *Y02E 30/39* (2013.01)

(56) References Cited

U.S. PATENT DOCUMENTS

| | | | |
|---|---|---|---|
| 5,909,099 A * | 6/1999 | Watanabe et al. | 320/108 |
| 6,319,604 B1 * | 11/2001 | Xu | 428/379 |
| 6,685,696 B2 * | 2/2004 | Fleischhacker et al. | 604/526 |
| 7,113,068 B2 * | 9/2006 | Chou | H01F 3/14 336/150 |
| 2010/0263897 A1 * | 10/2010 | Nolletti | 174/2 |
| 2010/0264761 A1 * | 10/2010 | Durantay | H02K 3/30 310/55 |
| 2011/0127065 A1 * | 6/2011 | Park | 174/110 R |

FOREIGN PATENT DOCUMENTS

| | | | |
|---|---|---|---|
| JP | 06-148372 A | | 5/1994 |
| JP | 07-130219 A | | 5/1995 |
| JP | 2000340039 A | * | 12/2000 |
| JP | 2004-132758 A | | 4/2004 |
| KR | 10-0957017 B1 | | 5/2010 |
| KR | 100957017 b1 | * | 5/2010 |

* cited by examiner (a)

(b)

COIL ASSEMBLY FOR A CONTROL ROD DRIVER HAVING IMPROVED THERMAL RESISTANCE, AND METHOD FOR MANUFACTURING THE SAME

CROSS-REFERENCE TO RELATED APPLICATIONS

The application is a continuation of International Application No. PCT/KR2011/000690 filed on Feb. 1, 2011, which claims priority to Korean Application No. 10-2011-0008242 filed Jan. 27, 2011, which applications are incorporated herein by reference.

TECHNICAL FIELD

The present invention relates to a coil assembly for a control rod driver for driving a nuclear power plant and a method for manufacturing the same, and more particularly, to a coil assembly for a control rod driver having improved thermal resistance in which coil deterioration is reduced by improving the heat resistance and thermal conductivity of coils to securely prevent coil deterioration and the fall of a control rod, caused by continuous operations of the control rod driver during an automatic load follow operation, thereby improving the safety and economic feasibility of a nuclear power plant, and a method for manufacturing the same.

BACKGROUND ART

A nuclear reactor is a device designed to gradually discharge a large amount of energy that is instantaneously emitted due to a mass defect occurring during nuclear fission of a nuclear fuel, thereby enabling nuclear energy to be applied to real life.

FIG. 1 is a cross-sectional view of a conventional nuclear reactor and a control rod driver.

A fuel assembly 2 is accommodated in the nuclear reactor 1. An assembly of a control rod 3 and a control rod driver attaching nozzle 4 that are configured to adjust the number of neutrons absorbed by nuclear fuel so as to control the combustion of the nuclear fuel, and a plurality of control rod driver 5 including control rod driving motors are installed on upper part of the nuclear reactor 1. The control rod 3 is vertically driven by the control rod driver 5.

The control rod driver is operated by a current signal flowing through four control rod driving coils, i.e., an upper lift coil (UL), an upper gripper coil (UG), a lower lift coil (LL), and a lower gripper coil (LG), and are configured to control the vertical movement of the control rod 3 by controlling motor driving using an electromagnetic force generated by power supplied to cables of the control rod driving coils.

The control rod driving coils used in the control rod driver 5 are required to have heat resistance so that the control rod driving coils may be prevented from deteriorating due to continuous operations of the control rod driver 5 during an automatic load follow operation. However, since coil wires are conventionally covered with an enamel-based insulating material, the coils deteriorate at a temperature that is higher than 220° C. to stop electricity generation. Thus, power generation is stopped until the system is re-operated, electric current is conducted through the coils due to the deterioration of and damage to the coils, and insulation breakdown thus occurs, causing the fall of the control rod and thereby degrading safety and reliability.

SUMMARY

It is an objective of the present invention to provide a coil assembly for use in a control rod driver, in which the heat resistance of control rod driving coils is improved to increase the lifespan thereof and the deterioration of the coils and the fall of a control rod are thus securely prevented due to continuous operations of the control rod driver during an automatic load follow operation, thereby improving the safety and economic feasibility of a nuclear power plant, and a method of manufacturing the same.

To accomplish the objective, a coil assembly having improved heat resistance for use in a control rod driver includes a covered wire including a coil wire and a polyether ether ketone (PEEK) coating layer covering an outer circumferential surface of the coil wire, and wound in multiple layers; a coil coating layer formed by filling gaps in the covered wire with varnish; an insulating tape layer covering external sides of a wound layer of the covered wire insulated by the coil coating layer; and silicon molding covering external sides of the insulating tape layer.

The coil wire may be a copper wire having no splices.

Both ends of the coil wire may be bound with a lead wire of a power supply cable by brazing.

To accomplish the objective, a method of manufacturing a coil assembly having improved heat resistance for use in a control rod driver includes manufacturing a covered wire by forming a polyether ether ketone (PEEK) coating layer on an outer circumferential surface of a coil wire; forming a wound layer by winding the covered wire in multiple layers, and binding both ends of the coil wire with a lead wire of a power supply cable; forming an insulating tape layer around the wound layer; forming a coil coating layer by filling gaps in the covered wire with varnish; drying the coil coating layer in a drying furnace; and applying silicon molding on an outer circumferential surface of the dried resultant.

The forming of the coil coating layer may be performed by vacuum impregnation.

In a coil assembly having improved heat resistance for use in a control rod driver and a method for manufacturing the same, the coil assembly is manufactured by forming a covered wire by covering an outer circumferential surface of a coil wire with a polyether ether ketone (PEEK) coating layer having chemical and mechanical characteristics such as heat resistance, forming a coil coating layer by filling gaps in the covered wire that is wound in multiple layers with varnish by vacuum impregnation, and sealing an outer circumferential surface of the coil coating layer with silicon molding. Thus, the coil assembly has higher heat resistance and lifespan than a conventional coil for use in a control rod driver, and greatly reduces coil deterioration and the fall of a control rod due to continuous operations of a control rod driver during an automatic load follow operation, thereby improving the safety and economic feasibility of a nuclear power plant.

DESCRIPTION OF REFERENCE NUMERALS

| | |
|---|---|
| 1: nuclear reactor | 2: nuclear fuel assembly |
| 3: control rod | 4: control rod driver attaching nozzle |
| 5: control rod driver | 100, 100-1, 100-2, 100-3, and 100-4: coil assembly |
| 110: covered wire | 111: coil wire |
| 112: PEEK coating layer | 120: insulating tape layer |
| 130: coil coating layer | 140: silicon molding |
| 210, 220, 230, 240: coil housing | 211, 221, 231, 241: lead wire connector |
| 310: the first control rod driving coil unit | 320: the second control rod driving coil unit |
| 330: the third control rod driving coil unit | 340: the fourth control rod driving coil unit |
| 410: upper plate | 420: lower plate |
| 430, 440, 460, 470: connection plate | 450: housing connection member |
| 431, 441, 461, 471: retainer coupling | 500: motor housing |
| 610: cable box | 620: cable assembly |
| 621: power supply cable | 622: connector |
| 710: cooling shroud | 720: upper shroud |

DETAILED DESCRIPTION

Hereinafter, structures and operations of exemplary embodiments of the present invention will be described in greater detail with reference to the accompanying drawings.

Figure 1:
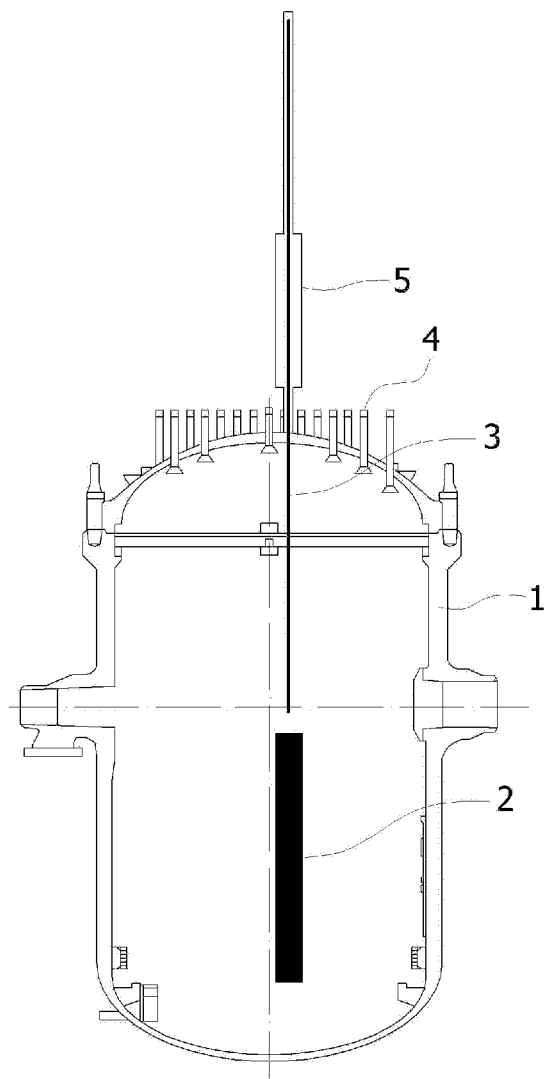
FIG. 1 is a cross-sectional view of a conventional nuclear reactor and a control rod driver.
Figure 2:
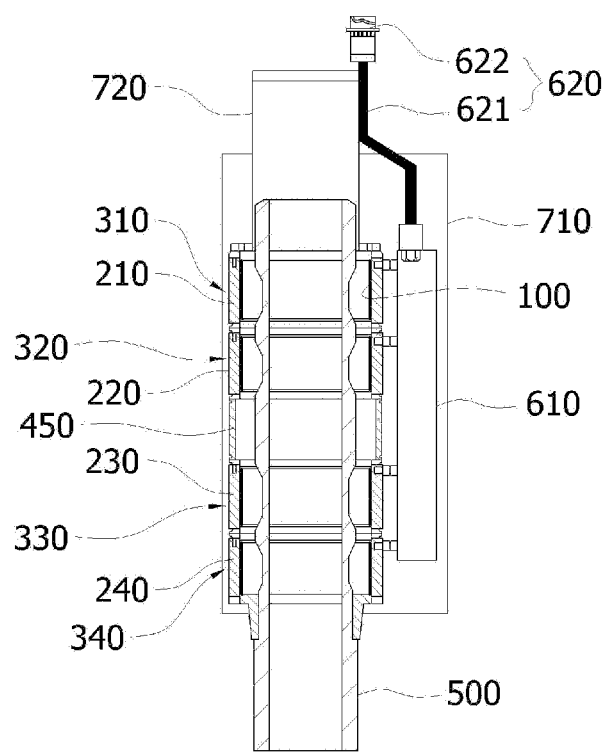
FIG. 2 is a cross-sectional view of a fully assembled state of a control rod driver according to an embodiment of the present invention.

FIG. 2 is a cross-sectional view of a fully assembled state of a control rod driver according to an embodiment of the present invention. FIG. 3(a) is a plan view of a coil assembly having improved heat resistance for use in a control rod driver, and FIG. 3(b) is a cross-sectional view taken along line A-A of FIG. 3(a). FIG. 4 is a cross-sectional view of a state in which a coil assembly having improved heat resistance for use in a control rod driver is combined with a coil housing according to an embodiment of the present invention.

Referring to FIG. 2, the control rod driver according to the present invention includes coil assemblies 100, 100-1, 100-2, 100-3, and 100-4, and first to fourth control rod driving coil units 310, 320, 330, and 340 in which the coil assembly 100 is mounted on inner circumferential surfaces thereof and that include coil housings 210, 220, 230, and 240 acting as a passage of an electromagnetic field induced when electric current is conducted through the coil assembly 100, respectively. An upper portion of the first control rod driving coil unit 310 and a lower portion of the fourth control rod driving coil unit 340 are combined with an upper plate 410 and a lower plate 420 each having a hole through which a motor housing 500 passes on a center portion thereof, respectively.

The upper plate 410 functions not only as a passage of an electromagnetic field when electric current is conducted through the coil assembly 100 but also as a cover of an upper face of the first coil housing 210. Screw taps are formed on the upper plate 410 to recover an assembly of the coil housings 210, 220, 230, and 240.

The lower plate 420 functions not only as a passage of an electromagnetic field when electric current is conducted through the coil assembly 100 but also as a cover of a lower face of the fourth coil housing 240, and supports all the control rod driving coil units 310, 320, 330, and 340 when the motor housing 500 is assembled.

An inner side of the coil assembly 100 mounted on the inner circumferential surfaces of the coil housings 210, 220, 230, and 240 is combined with the motor housing 500. In the motor housing 500, a motor assembly (not shown) which is a control rod driver is installed. Thus, the motor housing 500 is designed to endure pressure of a nuclear reactor, and transmit an electromagnetic force applied from the coil assembly 100 combined with external surfaces of the motor housing 500.

Lead wire connectors 211, 221, 231, and 241 in which both ends of coils of the respective coil assemblies 100-1, 100-2, 100-3, and 100-4 and a lead wire of a power supply cable 621 are united are formed at one side of the coil housings 210, 220, 230, and 240. The lead wire of the power supply cable 621 and both ends of the coils of the respective coil assemblies 100-1, 100-2, 100-3, and 100-4 are electrically connected to a connection terminal inside a cable box 610.

It is desired that both of the ends of the coils of the respective coil assemblies 100-1, 100-2, 100-3, and 100-4 and the lead wire of the power supply cable 621 may be united using brazing to minimize resistance therebetween.

The power supply cable 621 and a connector 622 coupled to one end of the power supply cable 621 form a cable assembly 620 configured to supply power to coils.

A cooling shroud 710 that guides cooled air to uniformly flow along the inside thereof is formed around the coil housings 210, 220, 230, and 240 to absorb heat generated by the coil assembly 100. An upper shroud 720 is formed on the coil housing 210, and a control rod location indicator (not shown) is installed in the upper shroud 720. The upper shroud 720 is combined with the coil housing 210 to recover the control rod driver.

Here, although the motor housing 500, the cooling shroud 710, and the upper shroud 720 are not elements of the control rod driver, these elements have also been illustrated and described above to assist in understanding of the present invention.

Figure 3:
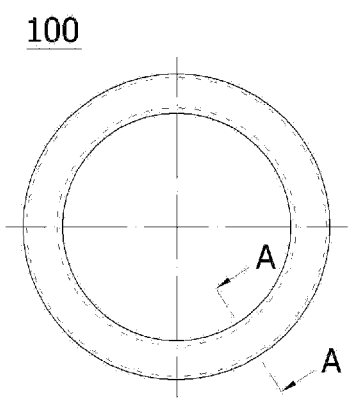
FIG. 3(a) is a plan view of a coil assembly having improved heat resistance for use in a control rod driver.
FIG. 3(b) is a cross-sectional view taken along line A-A of FIG. 3(a).
Figure 3:
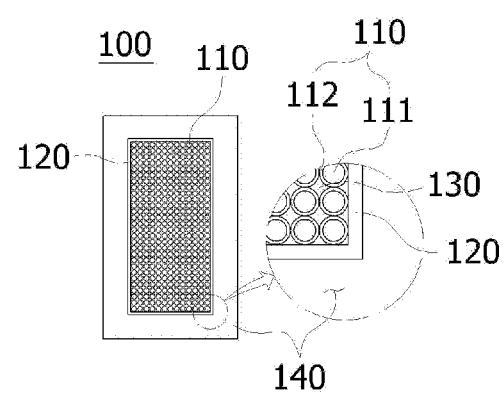
Figure 4:
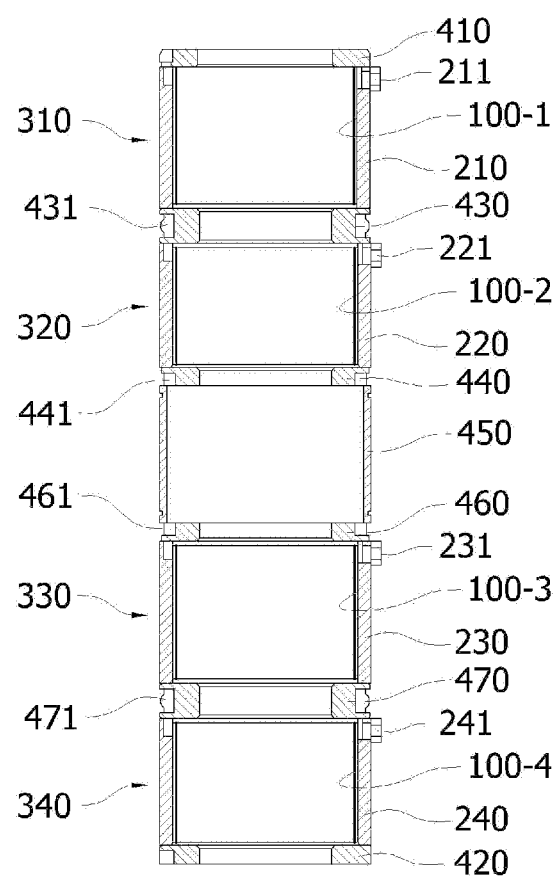
FIG. 4 is a cross-sectional view of a state in which a coil assembly having improved heat resistance for use in a control rod driver is combined with a coil housing according to an embodiment of the present invention.

Referring to FIG. 3, the coil assembly 100 for use in the control rod driver includes a coil wire 111, a polyether ether ketone (PEEK) coating layer 112 covering an outer circumferential surface of the coil wire 111, a covered wire 110 that includes the coil wire 111 and the PEEK coating layer 112 and is wound in multiple layers, a coil coating layer 130 formed by filling gaps in the covered wire 110 that is wound in multiple layers with varnish, an insulating tape layer 120 covering external sides of a wound layer of the covered wire 110 insulated by the coil coating layer 130, and a silicon molding 140 that seals the insulating tape layer 120 while encompassing external side surfaces of the insulating tape layer 120.

The coil wire 111 may be formed of a copper wire that has no splices when it is wound to improve heat resistance more than that of a conventional coil for use in a control rod driver.

A temperature at which the PEEK coating layer 112 covering the outer circumferential surface of the coil wires 111 can be continuously used is about 260° C. which is higher than a temperature at which the conventional enamel-based insulating material can be continuously used is about 220° C. Thus, the PEEK coating layer 112 greatly increases the heat resistance of coils.

PEEK is a crystalline resin that can be dissolved and shaped in a desired form, has good chemical properties including high thermal resistance, fatigue resistance, chemical resistance, radiation resistance, a hard burning property by which it generates no corrosive gas and less smoke, and good mechanical properties including high strength, high coefficient of expansion, and high shock resistance. Also, PEEK is very strong at high temperature and tensile stress applied to PEEK is maintained constant even when it is used for a long time.

According to the present invention, the covered wire 110 is formed by covering the external surfaces of the coil wire 111 formed of copper wire having no splices with the PEEK coating layer 112. Thus, the coil assembly 100 configured to operate in a special high-temperature environment of a nuclear reactor may be prevented from deteriorating and being damaged beforehand.

The insulating tape layer 120 is a heat-resistant glass fiber fabric, that fixes the shape of the wound layer of the covered wire 110 when external sides of the wound layer are covered with the insulating tape layer 120 and increases the adhesive properties of the silicon molding 140 applied onto the external sides of insulating tape layer 120.

The coil coating layer 130 filled with the varnish is formed by vacuum impregnation. Here, vacuum impregnation means a process of dipping the wound layer of the covered wire 110 whose shape is fixed by the insulating tape layer 120 into a tub containing an impregnation varnish solution, placing the tub in a vacuum chamber, and causing the tub to have a vacuum state so as to emit air and moisture present in gaps in the covered wire 110 to the outside due to the vacuum, thereby causing the varnish solution to impregnate into the gaps.

By forming the coil coating layer 130, impurities or air may be removed from the gaps in the covered wire 110 to increase a heat discharging effect and to maintain the shape of the coil assembly 100 after the coil coating layer 130 is dried to be hardened.

The silicon molding 140 is a heat-resistant rubber wrapping material configured to completely encompass the external sides of the coil coating layer 130 after the coil coating layer 130 is dried to be hardened, and protects the coil coating layer 130 from foreign substances such as external moisture, dust, air, etc.

Referring to FIG. 4, the coil assembly 100 configured as described above is manufactured using the first to fourth coil assembles 100-1, 100-2, 100-3, and 100-4 having the same structure. The first to fourth coil assembles 100-1, 100-2, 100-3, and 100-4 are respectively installed in the first to fourth coil housings 210, 220, 230, and 240 to form the first to fourth control rod driving coil units 310, 320, 330, and 340. The control rod drive mechanism (motor assembly) is operated by an electromagnetic field formed by sequentially supplying current to the first to fourth control rod driving coil units 310, 320, 330, and 340, according to programming of a controller (not shown).

The four coil housings 210, 220, 230, and 240 are connected by the connection plates 430, 440, 460, and 470 installed therebetween, and a housing connection member 450 is bound between the second coil housing 220 and the third coil housing 230 to maintain the distance between the second coil housing 220 and the third coil housing 230.

The first coil housing 210, the second coil housing 220, the housing connection member 450, the third coil housing 230, and the fourth coil housing 240 are fixed to be engaged with one another by retainer couplings 431, 441, 461, and 471 disposed on external surfaces of the respective connection plate 430, 440, 460, and 470.

Figure 5:
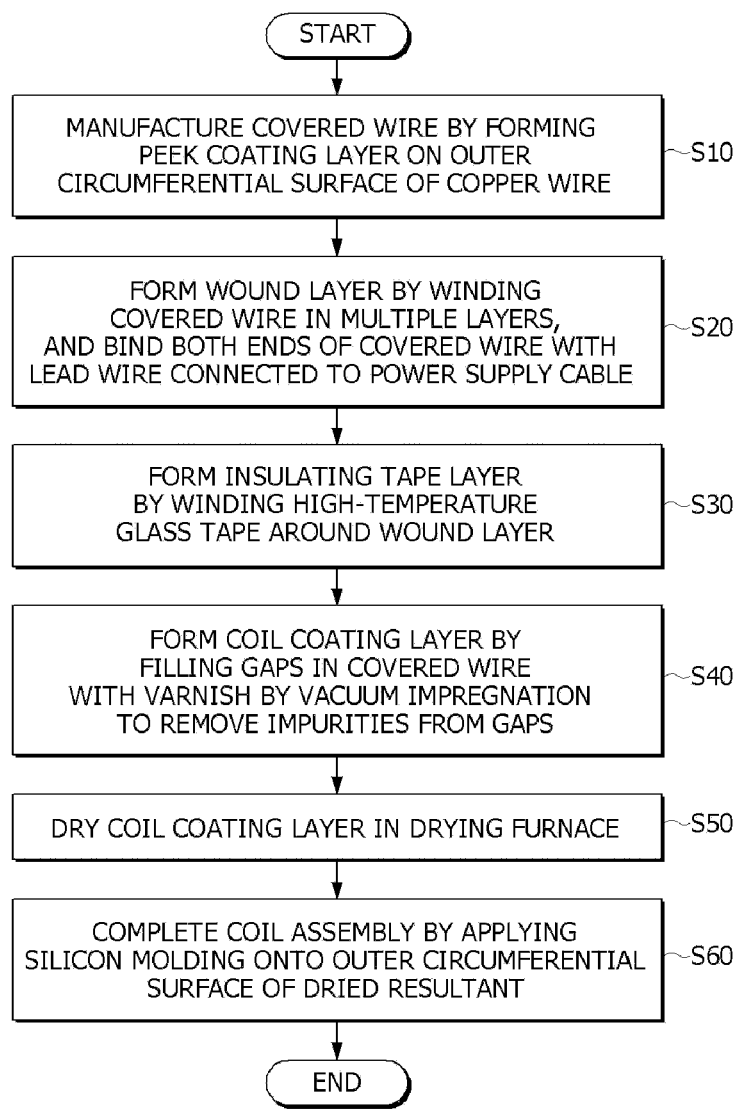
FIG. 5 is a flowchart illustrating a method of manufacturing a coil assembly having improved heat resistance for use in a control rod driver according to an embodiment of the present invention.

FIG. 5 is a flowchart illustrating a method of manufacturing a coil assembly having improved heat resistance for use in a control rod driver according to an embodiment of the present invention.

The method of manufacturing a coil assembly having improved heat resistance for use in a control rod driver according to an embodiment of the present invention includes manufacturing the covered wire 110 by forming the PEEK coating layer 112 on an outer circumferential surface of the coil wire 111, forming a wound layer by winding the covered wire 110 in multiple layers, binding both ends of the covered wire 110 with two pieces of a lead wire connected to the power supply cable 621, forming the insulating tape layer 120 around the wound layer of the covered wire 110, forming the coil coating layer 130 by filling the gaps in the covered wire 110 with varnish, drying the coil coating layer 130 in a drying furnace, and applying the silicon molding 140 onto an outer circumferential surface of the dried resultant.

It is desired that the binding of both of the ends of the covered wire 110 with the two pieces of the lead wire connected to the power supply cable 621 is performed using brazing to minimize resistance at the interfaces between both of the ends of the covered wire 110 and the two pieces of the lead wire connected to the power supply cable 621. The forming of the coil coating layer 130 may be performed by vacuum impregnation.

As described above, in a coil assembly having improved heat resistance for use in a control rod driver and a method for manufacturing the same according to the present invention, the heat resistance of the coil assembly may be improved and insulating properties between covered wires may be improved by vacuum impregnation. Thus, coils may be prevented beforehand from deteriorating or being damaged due to heat generation and insulation breakdown caused when electric charge is conducted through coils during driving of the control rod driver, thereby preventing the fall of a control rod.

The invention claimed is:

1. A coil assembly having improved heat resistance for use in a control rod driver, comprising:
   a covered wire (110) including a coil wire (111) and a polyether ether ketone (PEEK) coating layer (112) directly covering an outer circumferential surface of the coil wire (111), and wound in multiple layers;
   a coil coating layer (130) formed by filling gaps in the covered wire (110) with varnish;
   an insulating tape layer (120) directly covering external sides of a wound layer of the covered wire (110) insulated by the coil coating layer (130); and
   silicon molding (140) covering external sides of the insulating tape layer (120);
   wherein both ends of the coil wire (111) are bound with a lead wire of a power supply cable (621) by brazing.

2. The coil assembly of claim 1, wherein the coil wire (111) is a copper wire having no splices.

* * * * *